(12) United States Patent
Schick et al.

(10) Patent No.: US 11,023,662 B2
(45) Date of Patent: Jun. 1, 2021

(54) SYSTEMS AND METHODS FOR PROVIDING ADAPTIVE SURFACE TEXTURE IN AUTO-DRAFTED PATENT DOCUMENTS

(71) Applicant: Specifio, Inc., Marina del Rey, CA (US)

(72) Inventors: Ian C. Schick, Hermosa Beach, CA (US); Kevin Knight, Marina del Rey, CA (US); Jay Priyadarshi, Los Angeles, CA (US); Xing Shi, Playa Vista, CA (US)

(73) Assignee: Specifio, Inc., Marina Del Rey, CA (US)

( * ) Notice: Subject to any disclaimer, the term of this patent is extended or adjusted under 35 U.S.C. 154(b) by 0 days.

(21) Appl. No.: 16/840,236

(22) Filed: Apr. 3, 2020

(65) Prior Publication Data

US 2020/0234000 A1 Jul. 23, 2020

Related U.S. Application Data

(63) Continuation of application No. 16/221,070, filed on Dec. 14, 2018, now abandoned, which is a continuation-in-part of application No. 15/892,679, filed on Feb. 9, 2018, now Pat. No. 10,417,341.

(60) Provisional application No. 62/599,588, filed on Dec. 15, 2017, provisional application No. 62/626,222, filed on Feb. 5, 2018, provisional application No.
(Continued)

(51) Int. Cl.
*G06F 40/00* (2020.01)
*G06F 40/166* (2020.01)
*G06F 16/35* (2019.01)
*G06F 16/38* (2019.01)
*G06F 40/289* (2020.01)

(52) U.S. Cl.
CPC ............ *G06F 40/166* (2020.01); *G06F 16/35* (2019.01); *G06F 16/38* (2019.01); *G06F 40/289* (2020.01)

(58) Field of Classification Search
None
See application file for complete search history.

(56) References Cited

U.S. PATENT DOCUMENTS 6,014,663 A 1/2000 Rivette
6,049,811 A 4/2000 Petruzzi
(Continued)

OTHER PUBLICATIONS

Jhamtani, H., Gangal, V., Hovy, E., & Nyberg, E. (2017). Shakespearizing modern language using copy-enriched sequence-to-sequence models. arXiv preprint arXiv:1707.01161) (Year: 2017).*
(Continued)

*Primary Examiner* — Edgar X Guerra-Erazo
(74) *Attorney, Agent, or Firm* — Esplin & Associates, PC

(57) ABSTRACT

Systems and methods for providing adaptive surface texture in auto-drafted patent documents are disclosed. Exemplary implementations may: obtain a plurality of style attributes, a given style attribute being descriptive of a type of document characteristic that is often-repeated or habitual in patent documents; obtain values for the plurality of style attributes, a given value of a style attribute being descriptive of a specific document characteristic that is often-repeated or habitual in one or more sample patent documents; and provide an auto-drafted patent document exhibiting the values for the plurality of style attributes.

20 Claims, 2 Drawing Sheets

Related U.S. Application Data

62/459,357, filed on Feb. 15, 2017, provisional application No. 62/459,199, filed on Feb. 15, 2017, provisional application No. 62/459,208, filed on Feb. 15, 2017, provisional application No. 62/459,246, filed on Feb. 15, 2017, provisional application No. 62/459,235, filed on Feb. 15, 2017.

(56) References Cited

U.S. PATENT DOCUMENTS

| | | |
|---|---|---|
| 6,434,580 B1 | 8/2002 | Takano |
| 8,041,739 B2 | 10/2011 | Glasgow |
| 8,843,821 B2 | 9/2014 | Tran |
| 9,195,647 B1 | 11/2015 | Zhang |
| 9,542,360 B2 | 1/2017 | Tran |
| 9,600,566 B2 | 3/2017 | Ganti |
| 9,734,137 B2 | 8/2017 | Burchett |
| 9,836,805 B2 | 12/2017 | Rau |
| 9,906,515 B1 | 2/2018 | Tillman |
| 9,946,895 B1 | 4/2018 | Kruse |
| 9,990,351 B2 | 6/2018 | Tran |
| 1,024,206 A1 | 3/2019 | Lundberg |
| 1,041,734 A1 | 9/2019 | Schick |
| 1,046,942 A1 | 11/2019 | Conley |
| 1,057,260 A1 | 2/2020 | Schick |
| 1,062,137 A1 | 4/2020 | Schick |
| 1,074,795 A1 | 8/2020 | Priyadarshi |
| 2001/0049707 A1 | 12/2001 | Tran |
| 2003/0065637 A1 | 4/2003 | Glasgow |
| 2005/0144177 A1 | 6/2005 | Hodes |
| 2005/0210042 A1 | 9/2005 | Goedken |
| 2005/0261891 A1 | 11/2005 | Chan |
| 2006/0190807 A1 | 8/2006 | Tran |
| 2007/0174039 A1 | 7/2007 | Lin |
| 2008/0147656 A1 | 6/2008 | Kahn |
| 2008/0281860 A1 | 11/2008 | Elias |
| 2008/0313528 A1 | 12/2008 | Chang |
| 2010/0257089 A1 | 10/2010 | Johnson |
| 2010/0325716 A1 | 12/2010 | Hong |
| 2011/0184727 A1* | 7/2011 | Connor ............... G06F 40/253 704/9 |
| 2011/0246438 A1 | 10/2011 | Sathish |
| 2012/0101803 A1 | 4/2012 | Popov |
| 2012/0101804 A1 | 4/2012 | Roth |
| 2012/0251016 A1* | 10/2012 | Lyons ............... G06F 16/345 382/276 |
| 2012/0296835 A1 | 11/2012 | Khan |
| 2013/0282599 A1 | 10/2013 | Kang |
| 2014/0180934 A1 | 6/2014 | Surdeanu |
| 2014/0249801 A1 | 9/2014 | Jackson |
| 2015/0278810 A1 | 10/2015 | Ramatchandirane |
| 2016/0048936 A1 | 2/2016 | Perkowski |
| 2016/0232246 A1 | 8/2016 | Rau |
| 2016/0350886 A1 | 12/2016 | Jessen |
| 2017/0039174 A1* | 2/2017 | Strope ............... G06N 3/0454 |
| 2017/0185591 A1* | 6/2017 | Tetreault ............... G06F 40/253 |
| 2017/0185921 A1 | 6/2017 | Zhang |
| 2018/0018564 A1 | 1/2018 | Erenrich |
| 2018/0108014 A1 | 4/2018 | Williams |
| 2018/0113934 A1 | 4/2018 | Jablonski |
| 2018/0121419 A1 | 5/2018 | Lee |
| 2018/0232361 A1 | 8/2018 | Schick |
| 2018/0308003 A1 | 10/2018 | Singh |
| 2018/0329883 A1 | 11/2018 | Leidner |
| 2018/0357800 A1* | 12/2018 | Oxholm ............... G06N 3/084 |
| 2019/0005707 A1 | 1/2019 | Yamada |
| 2019/0034416 A1 | 1/2019 | Al Hasan |
| 2019/0332674 A1 | 10/2019 | Schick |

OTHER PUBLICATIONS

S. H. H. Ding, B. C. M. Fung, F. Iqbal and W. K. Cheung, "Learning Stylometric Representations for Authorship Analysis," in IEEE Transactions on Cybernetics, vol. 49, No. 1, pp. 107-121, Jan. 2019 (Year: 2019).*

Bouayad-Agha, N., Casamayor, G., Ferraro, G., Mille, S., Vidal, V., & Wanner, L. (Jun. 2009). Improving the comprehension of legal documentation: the case of patent claims. In Proceedings of the 12th International Conference on Artificial Intelligence and Law (pp. 78-87). (Year: 2009).*

Akihiro Shinmori et al: "Patent claim processing for readability", Patent Corpus Processing, Association for Computational Linguistics, N. Eight Street, Stroudsburg, PA, 18360 07960-1961, USA, Jul. 12, 2003 (Jul. 12, 2003), pp. 56-65, XP058144498, DOI: 10.3115/1119303.1119310, abstract, Sections 1-3.

International Search Report and Written Opinion, PCT Application No. PCT/US2018/018257, dated May 17, 2018, 15 pages.

Nadjet Bouayad-Agha et al: "Improving the comprehension of legal documentation", Artificial Intelligence and Law, ACM, 2, Penn Plaza, Suite 701 New York NY, 10121-0701 USA, Jun. 8, 2009 (Jun. 8, 2009), pp. 78-87, XP058361680, DOI: 10.1145/1568234.1568244; ISBN: 978-1-60558-597-0 abstract Sections 2-4; figures 1, 2.

Svetlana Sheremetyeva: "Natural language analysis of patent claims", Patent Corpus Processing, Association for Computational Linguistics, N. Eight Street, Stroudsburg, PA, 18360 07960-1961, USA, Jul. 12, 2003 (Jul. 12, 2003), pp. 66-73, XP058144499, DOI: 10.3115/1119303.1119311, abstract, Sections 1-4.

Tseng, Y. H., Lin, C. J., & Lin, Y. I. (2007). Text mining techniques for patent analysis. Information Processing & Management, 43(5), 1216-1247.

* cited by examiner

SYSTEMS AND METHODS FOR PROVIDING ADAPTIVE SURFACE TEXTURE IN AUTO-DRAFTED PATENT DOCUMENTS

FIELD OF THE DISCLOSURE

The present disclosure relates to systems and methods for providing adaptive surface texture in auto-drafted patent documents.

SUMMARY

One aspect of the present disclosure relates to a system configured for providing adaptive surface texture in auto-drafted patent documents. The system may include one or more hardware processors configured by machine-readable instructions. The processor(s) may be configured to obtain a plurality of style attributes, a given style attribute being descriptive of a type of document characteristic that is often-repeated or habitual in patent documents. The patent documents may include one or both of patent applications or issued patents. The processor(s) may be configured to obtain values for the plurality of style attributes, a given value of a style attribute being descriptive of a specific document characteristic that is often-repeated or habitual in one or more sample patent documents. The one or more sample patent documents may include one or both of patent applications or issued patents. The processor(s) may be configured to provide an auto-drafted patent document exhibiting the values for the plurality of style attributes. Being auto-drafted may include being created automatically by a computerized natural language generation system. By exhibiting the values for the plurality of style attributes, the auto-drafted patent document may embody some or all of a specific writing style.

Another aspect of the present disclosure relates to a method for providing adaptive surface texture in auto-drafted patent documents. The method may include obtaining a plurality of style attributes, a given style attribute being descriptive of a type of document characteristic that is often-repeated or habitual in patent documents. The patent documents may include one or both of patent applications or issued patents. The method may include obtaining values for the plurality of style attributes, a given value of a style attribute being descriptive of a specific document characteristic that is often- repeated or habitual in one or more sample patent documents. The one or more sample patent documents may include one or both of patent applications or issued patents. The method may include providing an auto-drafted patent document exhibiting the values for the plurality of style attributes. Being auto-drafted may include being created automatically by a computerized natural language generation system. By exhibiting the values for the plurality of style attributes, the auto-drafted patent document may embody some or all of a specific writing style.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
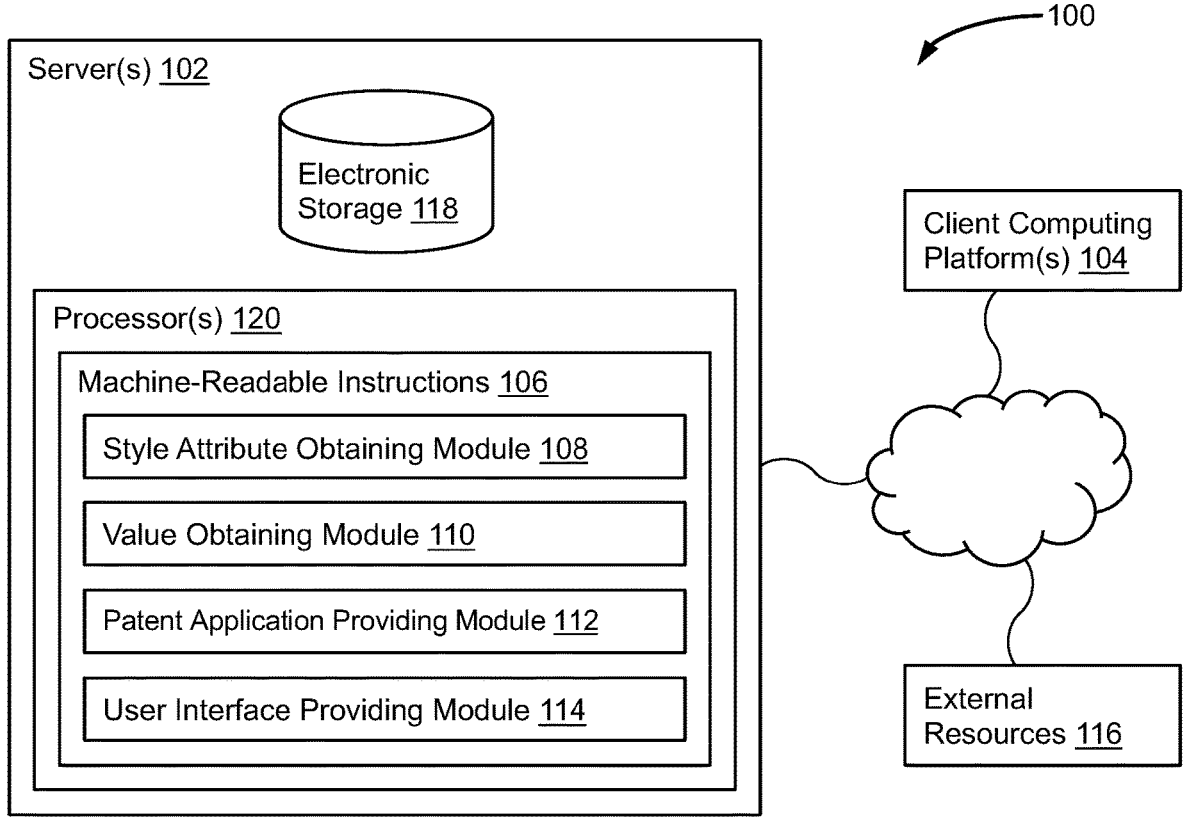
FIG. 1 illustrates a system configured for providing adaptive surface texture in auto-drafted patent documents, in accordance with one or more implementations.

FIG. 1 illustrates a system 100 configured for providing adaptive surface texture in auto-drafted patent documents, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a style attribute obtaining module 108, a value obtaining module 110, a patent application providing module 112, a user interface providing module 114, and/or other instruction modules.

Style attribute obtaining module 108 may be configured to obtain a plurality of style attributes. A given style attribute may be descriptive of a type of document characteristic that is often-repeated or habitual in patent documents. Examples of types of document characteristics may include one or more of aesthetic characteristics, organizational characteristics, prose characteristics, and/or other types of document characteristics.

The patent documents may include one or more of patent applications, issued patents, office action responses, office actions, patent litigation documents, and/or other patent documents. A given patent application may be a document. The patent application may include an application for sole rights to an invention, according to some implementations. The issued patent may include a patent that is issued. To be issued may include being prepared and issued for enforcement, license, or sale, according to some implementations. The patent may be a document. The patent may include a document granting an inventor sole rights to an invention, according to some implementations. A given office action response may include a patent practitioner's written response to an office action issued by a patent examination authority. A given office action may include a document prepared by a patent examiner which outlines one or more reasons for allowing or rejecting a patent application.

Value obtaining module 110 may be configured to obtain values for the plurality of style attributes, a given value of a style attribute being descriptive of a specific document characteristic that is often-repeated or habitual in one or more sample patent documents. A sample patent document may include a patent document that was previously prepared and that serves as a model for a desired outcome for an auto-drafted patent document.

The values for the plurality of style attributes may be associated with a single law firm. The law firm may be a firm. The law firm may include a firm of lawyers, patent attorneys, patent agents, and/or other legal professionals, according to some implementations.

The values for the plurality of style attributes may be associated with a single practice group within a law firm. A practice group of attorneys, patent agents, and/or other legal professionals. The practice group may be associated with or organized around a specific technology, a specific law firm client, and/or one or more rainmaker partners who attached business to the law firm. Patent documents prepared by members of the practice group may be stylistically similar.

The values for the plurality of style attributes may be associated with an individual patent practitioner. Patent documents prepared by the individual patent practitioner may be stylistically similar. The values for the plurality of style attributes at least partially define a writing style of a specific patent practitioner.

The values for the plurality of style attributes may be associated with an individual patent assignee. A patent assignee is a patent owner. The patent assignee may be a client of a law firm. Patent documents prepared for the individual patent assignee may be stylistically similar. The patent assignee may dictate style requirements for patent documents prepared for the patent assignee.

The values for the plurality of style attributes may be associated with a specific technology field. Patent documents prepared associated with the specific technology field may be stylistically similar. The stylistic similarities may result from common document and/or disclosure requirements associated with the technologyfield.

The values for the plurality of style attributes may be obtained based onmachine learning applied to the one or more sample patent documents. Machine learning may include an application of artificial intelligence (AI) that provides systems an ability to automatically learn and improve from experience without being explicitly programmed. The machine learning may be unsupervised. The machine learning may be semi-supervised. The machine learning may be supervised.

The one or more sample patent documents may include a collection of patent documents associated with a single law firm. The one or more sample patent documents may include a collection of patent documents associated with a single practice group within a law firm. The one or more sample patent documents may include a collection of patent documents associated with a single patent practitioner.

The one or more sample patent documents may include a collection of patent documents associated with a single patent assignee. The one or more sample patent documents may include a collection of patent documents associated with a specific technology field. By way of non-limiting example, the values for the plurality of style attributes may be obtained by an automated evaluation of the one or more sample patent documents for word patterns, part-of-speech patterns, word choice, or sentence structure. The word choice may include a tendency to use one word over another. For example, a patent practitioner may choose to use the term "implementation" instead of the term "embodiment" throughout their patent applications. The sentence structure may be a structure. The sentence structure may include the grammatical arrangement of words in sentences, according to some implementations.

The values for the plurality of style attributes may be obtained based on poling one or more patent practitioners. A given patent practitioner may include one licensed to practice patent law before a patent examination authority of a jurisdiction in which the given patent practitioner practices. Examples of the given patent practitioner may include one or more of a patent attorney, a patent agent, and/or other patent practitioners.

The values for the plurality of style attributes may be obtained by an automated question-and-answer sequence completed by an individual patent practitioner. The automated question-and-answer sequence may include an interaction between a patent practitioner and an automated system. The automated system may provide questions and comments to the patent practitioner, to which the patent practitioner can respond. The questions and/or comments provided by the automated system may be adaptive with respect to responses from the patent practitioner. By way of non-limiting example, the automated question-and-answer sequence may be provided by one or more of a chat bot, an intelligent email agent, or voice-based AI (e.g., Siri, Alexa, etc.).

In some implementations, a question may ask the individual patent practitioner to select between two slightly different sentences based on her own writing style preferences. The difference(s) between the two sentences may be a result of the two sentences having dissimilar values for one or more style attributes.

Patent application providing module 112 may be configured to provide an auto-drafted patent document exhibiting the values for the plurality of style attributes. In some implementations, being auto-drafted may include being created automatically by a computerized natural language generation (NLG) system. The natural language generation system may be configured to perform one or more natural language processing tasks of generating natural language from a machine representation system. Examples of the machine representation system may include one or more of a knowledge base, a logical form, and/or other machine representation systems. In some implementations, the natural language generation system may include a translator that converts data into a natural language representation.

The auto-drafted patent document may be provided responsive to receipt of one or more claim sets and one or more sample patent documents. A given claim set includes exactly one independent claim and zero or more dependent claims that reference the independent claim. The one or more claim sets and the one or more sample patent documents may be received by email. The email may be a telecommunicate. The email may include communicating electronically on the computer, according to some implementations. Examples of the email may include one or more of email messages, spam, and/or other emails.

The one or more claim sets and the one or more sample patent documents may be received via an application programming interface (API). The application programming interface may include a set of subroutine definitions, protocols, and/or tools for building application software. The application programming interface may include specifications for one or more of routines, data structures, object classes, variables, remote calls, and/or other specifications.

The one or more claim sets and the one or more sample patent documents may be received via a web-based user interface or web interface. The web interface may be configured to facilitate an interaction between a user and software running on a web server. The user interface may include a web browser and a web page it downloaded and rendered. The user interface may be a program. The user interface may include a program that controls a display for the user and that allows the user to interact with the system, according to some implementations. Examples of the user interface may include one or more of command line interface, graphical user interface, and/or other user interfaces.

In some implementations, the sample patent documents were manually-written by a human patent practitioner. In some implementations, the sample patent documents were at least partially manually-written by a human patent practitioner. In some implementations, the sample patent documents were auto-drafted.

By exhibiting the values for the plurality of style attributes, the auto-drafted patent document may embody some or all of a specific writing style. The specificwriting style may be associated with a single law firm. The specific writing style may be associated with a single practice group within a law firm. The specific writing style may be associated with a single patent practitioner. The specific writing style may be associated with a single patent assignee. The specific writing style may be associated with a specific technology field.

User interface providing module 114 may be configured to provide, for visual presentation, a user interface to an individual patent practitioner. The visual presentation may include a presentation that is relating to or using sight, according to some implementations. The user interface may convey the values for the plurality of style attributes such that the individual patent practitioner can selectively change one or more of the values.

In some implementations, by way of non-limiting example, the given style attribute may include one or more of a tendency toward permissive language in specification, word choice between implementations and embodiments, or whether lists of examples are open or closed. A given implementation may be an enforcement. The implementation may include the act of accomplishing some aim or executing some order, according to some implementations. A given embodiment may be a personification. The embodiment may include a new personification of a familiar idea, according to some implementations. Examples of the embodiment may include one or more of deification, reincarnation, and/or other embodiments.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information outside of system 100, external entities participating with system 100, and/or other resources. In some implementations, some or all of the functionality attributed herein to external resources 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 108, 110, 112, 114, and/or other modules. Processor(s) 120 may be configured to execute modules 108, 110, 112, 114, and/or other modules by software; hardware; firmware; some combination of software, hardware, and/or firmware; and/or other mechanisms for configuring processing capabilities on processor(s) 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, and 114 are illustrated in FIG. 1 as being implemented within a single processing unit, in implementations in which processor(s) 120 includes multiple processing units, one or more of modules 108, 110, 112, and/or 114 may be implemented remotely from the other modules. The description of the functionality provided by the different modules 108, 110, 112, and/or 114 described below is for illustrative purposes, and is not intended to be limiting, as any of modules 108, 110, 112, and/or 114 may provide more or less functionality than is described. For example, one or more of modules 108, 110, 112, and/or 114 may be eliminated, and some or all of its functionality may be provided by other ones of modules 108, 110, 112, and/or 114. As another example, processor(s) 120 may be configured to execute one or more additional modules that may perform some or all of the functionality attributed below to one of modules 108, 110, 112, and/or 114.

Figure 2:
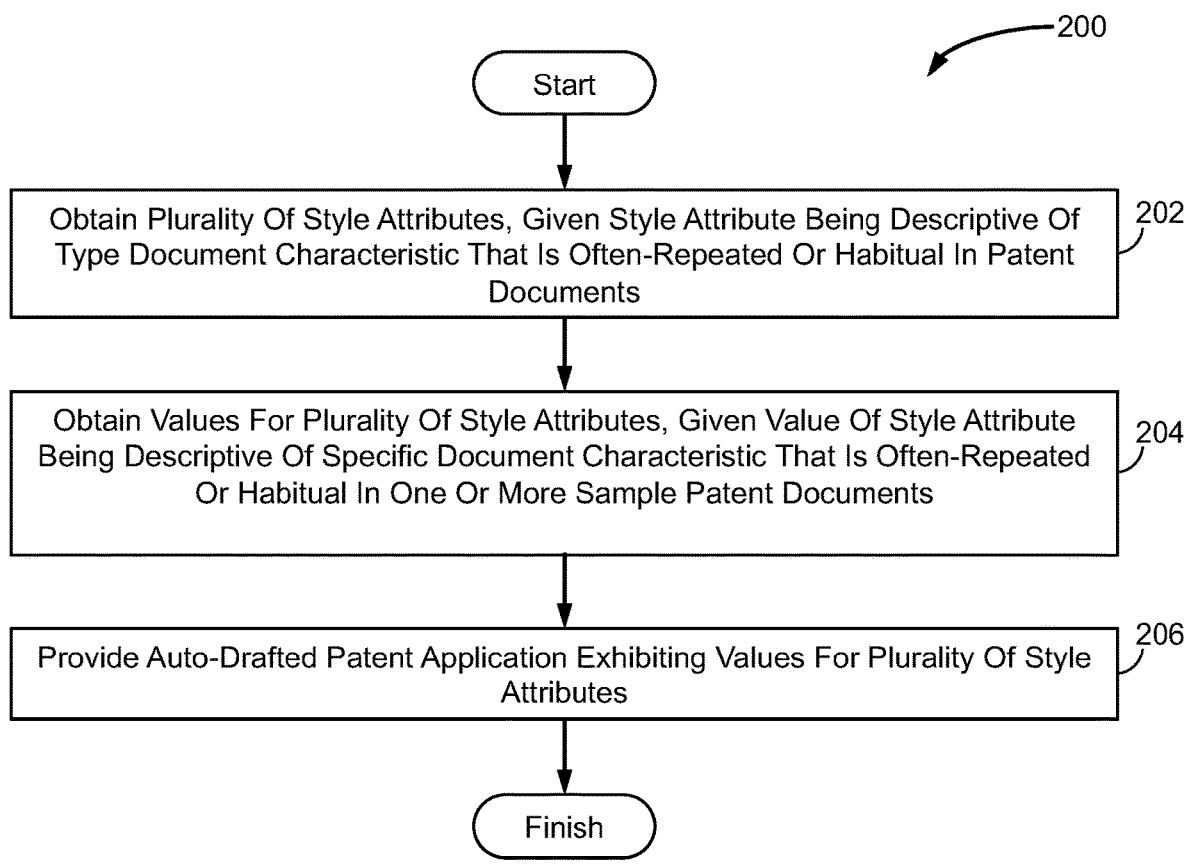
FIG. 2 illustrates a method for providing adaptive surface texture in auto-drafted patent documents, in accordance with one or more implementations.

FIG. 2 illustrates a method 200 for providing adaptive surface texture in auto-drafted patent documents, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a plurality of style attributes, a given style attribute being descriptive of a type of document characteristic that is often-repeated or habitual in patent documents. The patent documents may include one or both of patent applications or issued patents. Operation 202 may be performed by one or more hardware processors configured by machine-readable instructions including a module that is the same as or similar to style attribute obtaining module 108, in accordance with one or more implementations.

An operation 204 may include obtaining values for the plurality of style attributes, a given value of a style attribute being descriptive of a specific document characteristic that is often-repeated or habitual in one or more sample patent documents. The one or more sample patent documents may include one or both of patent applications or issued patents. Operation 204 may be performed by one or more hardware processors configured by machine-readable instructions including a module that is the same as or similar to value obtaining module 110, in accordance with one or more implementations.

An operation 206 may include providing an auto-drafted patent document exhibiting the values for the plurality of style attributes. Being auto-drafted may include being created automatically by a computerized natural language generation system. By exhibiting the values for the plurality of style attributes, the auto-drafted patent document may embody some or all of a specific writing style. Operation 206 may be performed by one or more hardware processors configured by machine-readable instructions including a module that is the same as or similar to patent application providing module 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing adaptive surface texture in auto-drafted patent documents, the system comprising:

one or more hardware processors configured by machine-readable instructions to:

obtain a plurality of style attributes, a given style attribute being descriptive of a type of document characteristic that is often-repeated or habitual in patent documents, the patent documents including one or both of patent applications or issued patents;

obtain values for the plurality of style attributes, a given value of a style attribute being descriptive of a specific document characteristic that is often-repeated or habitual in one or more sample patent documents, the one or more sample patent documents including one or both of patent applications or issued patents; and provide an auto-drafted patent document exhibiting the values for the plurality of style attributes, wherein being auto-drafted includes being created automatically by a computerized natural language generation system, wherein, by exhibiting the values for the plurality of style attributes, the auto-drafted patent document embodies some or all of a specific writing style.

2. The system of claim 1, wherein the given style attribute includes one or more of a tendency toward permissive language in specification, word choice between implementations and embodiments, or whether lists of examples are open or closed.

3. The system of claim 1, wherein the values for the plurality of style attributes are associated with one or more of a single law firm, a single practice group within a law firm, an individual patent practitioner, an individual patent assignee, or a specific technology field.

4. The system of claim 1, wherein the values for the plurality of style attributes at least partially define a writing style of a specific patent practitioner.

5. The system of claim 1, wherein the values for the plurality of style attributes are obtained based on machine learning applied to the one or more sample patent documents.

6. The system of claim 1, wherein the values for the plurality of style attributes are obtained by an automated evaluation of the one or more sample patent documents for word patterns, part-of-speech patterns, word choice, or sentence structure.

7. The system of claim 1, wherein the specific writing style is associated with one or more of a single law firm, a single practice group within a law firm, a single patent practitioner, a single patent assignee, or a specific technology field.

8. The system of claim 1, wherein the auto-drafted patent document is provided responsive to receipt of one or more claim sets and one or more sample patent documents.

9. The system of claim 8, wherein the one or more claim sets and the one or more sample patent documents are received by one or more of email, an application programming interface, or a web-based user interface.

10. The system of claim 1, wherein the one or more hardware processors are further configured by machine-readable instructions to provide, for visual presentation, a user interface to an individual patent practitioner, the user interface conveying the values for the plurality of style attributes such that the individual patent practitioner can selectively change one or more of the values.

11. A method for providing adaptive surface texture in auto-drafted patent documents, the method comprising:
    obtaining a plurality of style attributes, a given style attribute being descriptive of a type of document characteristic that is often-repeated or habitual in patent documents, the patent documents including one or both of patent applications or issued patents;
    obtaining values for the plurality of style attributes, a given value of a style attribute being descriptive of a specific document characteristic that is often-repeated or habitual in one or more sample patent documents, the one or more sample patent documents including one or both of patent applications or issued patents; and
    providing an auto-drafted patent document exhibiting the values for the plurality of style attributes, wherein being auto-drafted includes being created automatically by a computerized natural language generation system, wherein, by exhibiting the values for the plurality of style attributes, the auto-drafted patent document embodies some or all of a specific writing style.

12. The method of claim 11, wherein the given style attribute includes one or more of a tendency toward permissive language in specification, word choice between implementations and embodiments, or whether lists of examples are open or closed.

13. The method of claim 11, wherein the values for the plurality of style attributes are associated with one or more of a single law firm, a single practice group within a law firm, an individual patent practitioner, an individual patent assignee, or a specific technology field.

14. The method of claim 11, wherein the values for the plurality of style attributes at least partially define a writing style of a specific patent practitioner.

15. The method of claim 11, wherein the values for the plurality of style attributes are obtained based on machine learning applied to the one or more sample patent documents.

16. The method of claim 11, wherein the values for the plurality of style attributes are obtained by an automated evaluation of the one or more sample patent documents for word patterns, part-of-speech patterns, word choice, or sentence structure.

17. The method of claim 11, wherein the specific writing style is associated with one or more of a single law firm, a single practice group within a law firm, a single patent practitioner, a single patent assignee, or a specific technology field.

18. The method of claim 11, wherein the auto-drafted patent document is provided responsive to receipt of one or more claim sets and one or more sample patent documents.

19. The method of claim 18, wherein the one or more claim sets and the one or more sample patent documents are received by one or more of email, an application programming interface, or a web-based user interface.

20. The method of claim 11, further comprising providing, for visual presentation, a user interface to an individual patent practitioner, the user interface conveying the values for the plurality of style attributes such that the individual patent practitioner can selectively change one or more of the values.

\* \* \* \* \*